(12) United States Patent
Rozas et al.

(10) Patent No.: US 7,724,027 B2
(45) Date of Patent: May 25, 2010

(54) METHOD AND SYSTEM FOR ELASTIC SIGNAL PIPELINING

(76) Inventors: Guillermo J. Rozas, 104 Magneson Ter., Los Gatos, CA (US) 95032; Robert P. Masleid, 17266 Eaton La., Monte Sereno, CA (US) 95930

( * ) Notice: Subject to any disclaimer, the term of this patent is extended or adjusted under 35 U.S.C. 154(b) by 51 days.

(21) Appl. No.: 11/096,354

(22) Filed: Mar. 31, 2005

(65) Prior Publication Data

US 2006/0220678 A1 Oct. 5, 2006

(51) Int. Cl.
*H03K 19/173* (2006.01)
*G06F 7/38* (2006.01)

(52) U.S. Cl. .............. 326/38; 326/46; 327/407

(58) Field of Classification Search .......... 326/38, 326/46, 93, 105; 327/407; 713/400, 401
See application file for complete search history.

(56) References Cited

U.S. PATENT DOCUMENTS

| | | | |
|---|---|---|---|
| 5,453,708 A | 9/1995 | Gupta et al. | |
| 5,610,548 A | 3/1997 | Masleid | |
| 5,721,886 A * | 2/1998 | Miller | 713/400 |
| 5,880,612 A | 3/1999 | Kim | |
| 6,025,738 A | 2/2000 | Masleid | |
| 6,081,462 A * | 6/2000 | Lee | 365/194 |
| 6,133,759 A | 10/2000 | Beck et al. | |
| 6,154,045 A | 11/2000 | Ye et al. | |
| 6,188,259 B1 | 2/2001 | Amir et al. | |
| 6,466,063 B2 | 10/2002 | Chen | |
| 6,577,176 B1 | 6/2003 | Masleid et al. | |
| 6,630,851 B2 | 10/2003 | Masleid | |
| 6,664,807 B1 | 12/2003 | Crotty et al. | |
| 6,731,140 B2 | 5/2004 | Masleid et al. | |
| 6,799,280 B1 * | 9/2004 | Edenfield et al. | 713/400 |
| 6,956,405 B2 | 10/2005 | Lundberg | |
| 6,988,215 B2 * | 1/2006 | Splett et al. | 713/400 |
| 7,076,682 B2 | 7/2006 | Jacobson | |
| 7,119,580 B2 | 10/2006 | Masleid et al. | |
| 7,256,634 B2 | 8/2007 | Masleid | |
| 2002/0039347 A1 | 4/2002 | Matsugatani et al. | |
| 2002/0087930 A1 | 7/2002 | Kanba | |
| 2004/0032290 A1 | 2/2004 | Lundberg | |
| 2005/0195642 A1 | 9/2005 | Schmitt | |
| 2005/0206432 A1 | 9/2005 | Tobita | |
| 2006/0220678 A1 | 10/2006 | Rozas et al. | |

FOREIGN PATENT DOCUMENTS

JP 13188638 7/2001

(Continued)

OTHER PUBLICATIONS

Webster's II Riverside University Dictionary; p. 406, 407; 1984.

(Continued)

*Primary Examiner*—Daniel D. Chang

(57) ABSTRACT

A method for configuring a signal path within a digital integrated circuit. The method includes transmitting an output from a first logic module, receiving the output at a second logic module, and conveying the output from the first logic module to the second logic module by using a configurable signal path. The configurable signal path is variable by selectively including at least one latch.

22 Claims, 6 Drawing Sheets

FOREIGN PATENT DOCUMENTS

WO    02/15195    2/2002

OTHER PUBLICATIONS

Notice of Allowance Mailed Mar. 30, 2007; 11176918; TRAN-P443.
Notice of Allowance Mailed Dec. 15, 2006; 11176918; TRAN-P443.
Advisory Action Mailed Feb. 26, 2009; 11893221; TRAN-P443C1.
Final Office Action Mailed Dec. 4, 2008; 11893221; TRAN-P443C1.
Non-Final Office Action Mailed Feb. 1, 2008; 11893221; TRAN-P443C1.
Non-Final Office Action Mailed Jun. 27, 2008; 11893221; TRAN-P443C1.
Final Office Action Mailed May 8, 2009; Serial No. 11893221; TRAN-P443C1.

* cited by examiner

METHOD AND SYSTEM FOR ELASTIC SIGNAL PIPELINING

TECHNICAL FIELD

The present invention relates to signal propagation for digital integrated circuit devices.

BACKGROUND ART

The design and fabrication of high-performance signaling mechanisms for digital integrated circuit devices has become a significant challenge. For example, with respect to high-performance digital integrated circuit devices operating at high frequencies, ensuring the reliable transmission of signals between the various components of such devices has become problematic. In the past, slower clock speeds allowed sufficient margins in the timing constraints for signal propagation delay. However, modern integrated circuit designs require exacting control of critical timing specifications, and design parameters must be strictly maintained to keep the entire system in balance. Additionally, the system should run efficiently across different clock frequencies. Optimizations to ensure stable high-frequency operation should not unduly penalize the system during low-frequency operation. Thus what is required is a solution that can ensure critical timing specifications remain within certain specified parameters across a range of different operating frequencies.

DISCLOSURE OF THE INVENTION

Embodiments of the present invention provide a method and system for elastic signal pipelining.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE EMBODIMENTS

Figure 1:
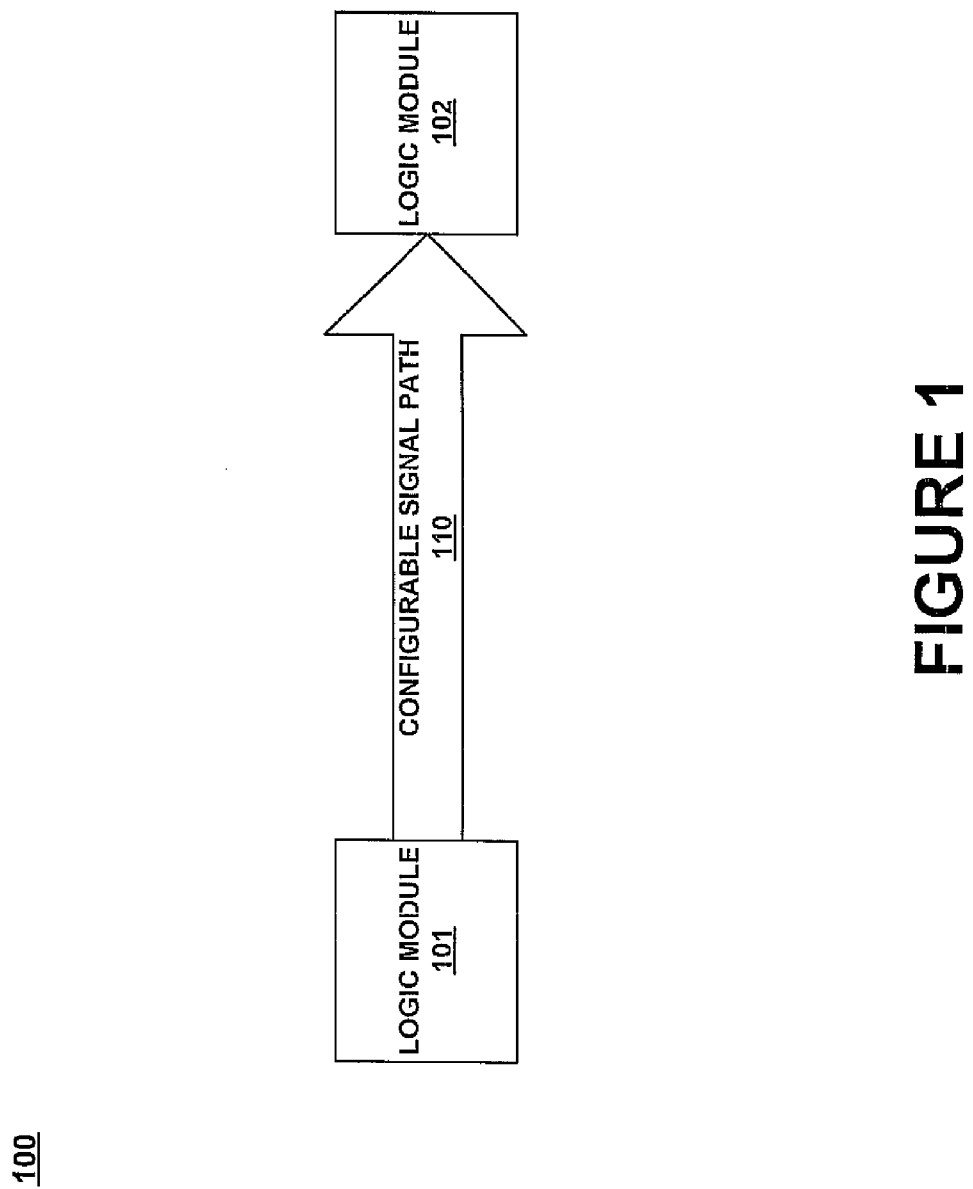
FIG. 1 shows a diagram of an elastic pipeline system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention implement a method and system for configuring one or more signal paths within a digital integrated circuit. The digital integrated circuit includes a plurality of functional modules linked together via configurable signal paths. Signals from one logic module to another are transmitted via a configurable signal path. The configurable signal path is variable by selectively including one or more programmable latch/repeaters on the signal path. The programmable latch/repeaters effectively pipeline the signal path to enable a higher operating frequency. The higher the operating frequency, the more programmable latch/repeaters are selectively included. As the operating frequency decreases, programmable latch/repeaters are selectively removed from signal path. In this manner, the configurable signal path of the present invention implements an elastic signal pipeline that can optimize the number of programmable latch/repeaters included thereon, to most efficiently match a signal propagation delay to an operating frequency of the digital integrated circuit. Embodiments of the present invention and their benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "accessing" or "recognizing" or "retrieving" or "translating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Present Invention

FIG. 1 shows a diagram of an elastic pipeline system 100 in accordance with one embodiment of the present invention. As depicted in FIG. 1, system 100 includes a first logic module 101 and a second logic module 102. A configurable signal path 110 is shown coupling the logic module 101 and 102.

In the FIG. 1 embodiment, signals from the logic module 101 to transmitted to the logic module 102 via the configurable signal path 110. The configurable signal path 110 is variable by selectively including one or more programmable latch/repeaters.

It should be noted that as used herein, the term programmable latch/repeater can refer to programmable latch devices, programmable repeater devices, semi-transparent latch devices, edge triggered flop devices, and similar types of storage elements. The particular detailed configuration of a programmable latch/repeater can vary depending upon the specifics of an implementation.

Referring still to FIG. 1, the programmable latch/repeaters effectively pipeline the signal path 110 to enable a higher operating frequency. For example, at high clock frequencies, the actual physical distance between the logic module 101 and the logic module 102 (e.g., the distance across the integrated circuit die) may be too long to enable reliable propagation of a signal between them in one cycle. Embodiments of the present invention overcome the problem by selectively including/excluding programmable latch/repeaters on the configurable signal path 110 to ensure a reliable propagation of the signals.

Figure 2:
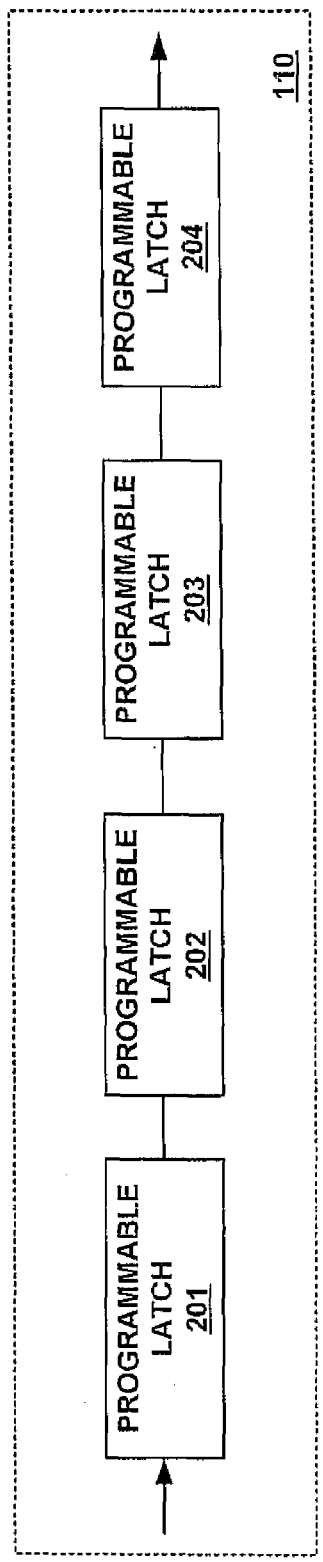
FIG. 2 shows a diagram of the configurable signal path in accordance with one embodiment of the present invention.

FIG. 2 shows a diagram of the configurable signal path 110 in accordance with one embodiment of the present invention. As depicted in FIG. 2, the configurable signal path 110 includes a plurality of programmable latch/repeaters 201-204.

As described above, as the operating frequency of system 100 increases, more of the programmable latch/repeaters 201-204 are selectively included on the signal path 110. As the operating frequency decreases, one or more of the programmable latch/repeaters 201-204 are selectively removed from signal path 110. In this manner, the configurable signal path of the present invention can optimize the number of programmable latch/repeaters included on the signal path 110 to most efficiently match a signal propagation delay related to an operating frequency of the digital integrated circuit.

In this manner, embodiments of the present invention are able to best optimize signal transmission paths between logic modules. For example, for given integrated circuit design, as transistor geometries decrease with successive process generations, and as transistors speed up by a substantial amount (e.g., in the order of 25-30% per generation), the wires that connect transistors can be configured for greater speed or lesser speed at the same rate.

For example, as the process geometries of a given design shrink, the wire cross-section decreases thereby increasing resistance, while the length decreases, decreasing resistance and capacitance. Thus the wires speed up somewhat, but not as much as the transistors. This means that micro-architectures progressively have their timing dominated not by the logic depth of their combinational circuits, but rather by the transit time in the wires, especially those between functional blocks.

The prior art solution to this problem is to simply add extra registers or latches along the path, especially for the long distance wires of a design. This allows cycle time to decrease at the rate that the transistor speed would allow, but has a downside, which is that per-clock performance suffers, as operations that involve data transit increase the number of clocks that they take. For a chip that is only going to run at maximum speed (e.g., a high-performance memory, high-performance processor, etc.), this may be an acceptable trade-off. But many other chips need to retain a large dynamic range of operation. Such chips need to run at very high frequencies in some systems and under some conditions, and run at lower frequencies in other systems and under other conditions (e.g., to reduce heat generation, battery drain, etc.).

Thus the prior art solution forces a difficult choice: Should the number of registers be optimized for speed, thereby sacrificing per-clock performance in the situations where the system will operate at a lower frequency? Or should frequency be sacrificed in the interest of per-clock performance, which matters especially at lower frequencies.

Embodiments of the present invention accommodate both situations by implementing configurable signal paths, or "elastic pipelines," that allow system designers to design a chip for very high frequency, while per-clock performance is not sacrificed when running at lower frequencies.

Figure 3:
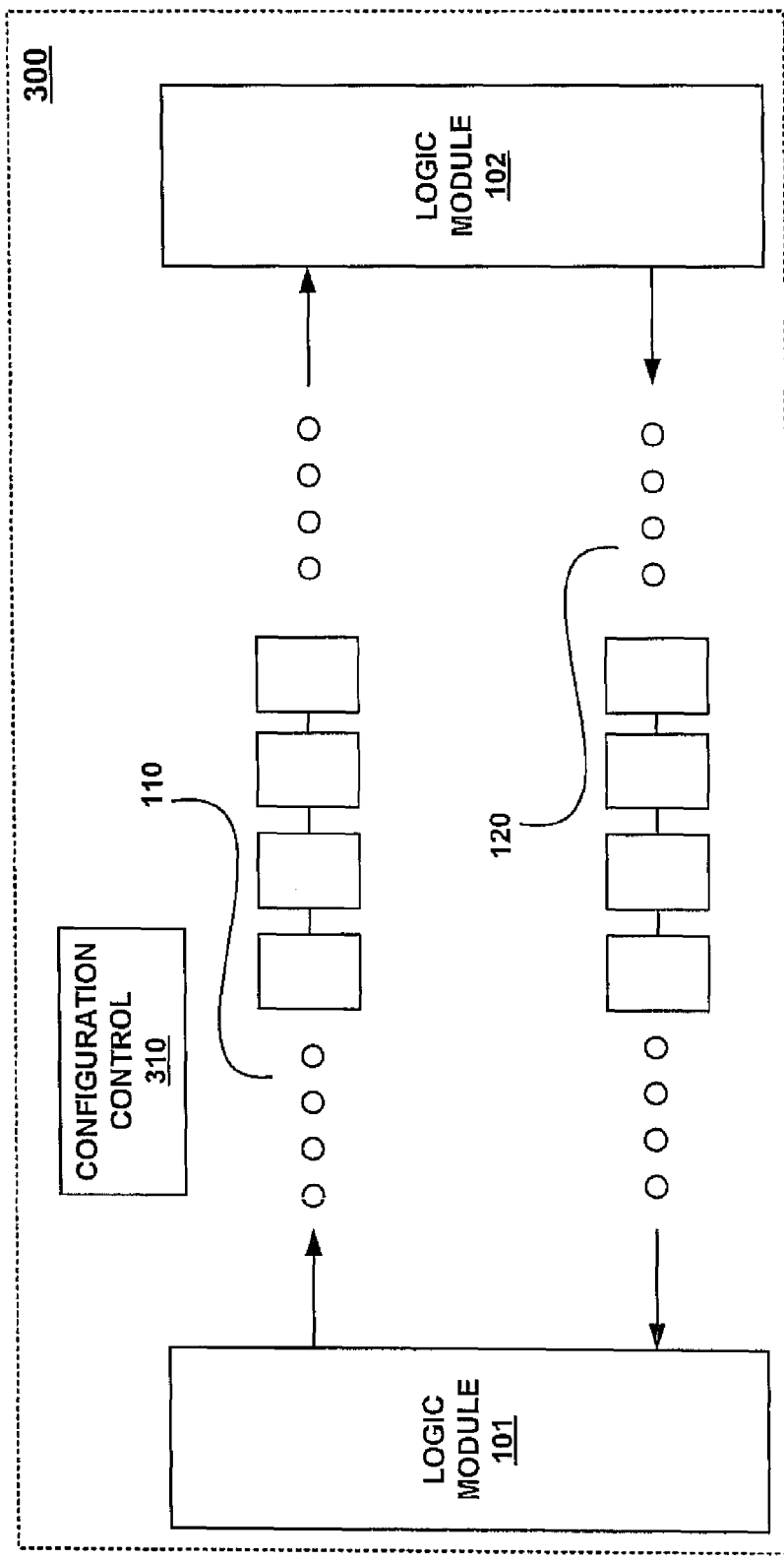
FIG. 3 shows a diagram of a system employing configurable signal paths in accordance with one embodiment of the present invention.

FIG. 3 shows a diagram of a system 300 employing configurable signal paths (e.g., configurable signal paths 110 and 120) in accordance with one embodiment of the present invention. The configurable signal paths 110 and 120 effectively decouple the logic modules (e.g., logic blocks) 101 and 102, and implement variable cycle transit signal paths between them. As known by those skilled in the art, the logic modules 101 and 102 are decoupled, meaning that a set of defined protocols govern communication between blocks/units so that either side can take longer or shorter to accomplish its task, with the other side still operating properly. For example, rather than expect a reply/response/result in exactly 3 cycles, the protocol between the two modules 101 and 102 is such that the requesting module receives the reply/response/result an arbitrary number of cycles later and is told by the other module when the result is arriving.

An example of such a protocol is the HyperTransport protocol. It is essentially a de-coupling protocol between two chips. The two chips use the protocol for inter-chip communication. HyperTransport happens to be external to a chip, but similar protocols can be used internally.

In one embodiment, when the modules 101 and 102 communicate over the configurable signal paths 110 and 120 in a decoupled protocol, each module has an internal register (or latch) to interface to the path. The originating module has a register within it from which the outgoing information starts its travel towards the other module. Similarly, the receiving module has a register within it to receive the incoming information. This allows timing analysis to proceed locally within each of these modules, as the data is delivered locally (to the outgoing register or latch) and received locally (from the incoming register or latch).

In the present embodiment, to handle inter-module distance, additional registers/latches (e.g., programmable latch/repeaters) are placed at periodic distances along the signal paths 110 and 120. Since the protocol between the modules is decoupled, the system 300 will function properly whatever the number of intermediate programmable latch/repeaters ends up being linked into the path. Thus the placement and number of programmable latch/repeaters can conceptually wait until the last moment, when the timing of the slowest internal path is known. At that point the maximum distance between programmable latch/repeaters is known, and that determines how many are needed on a long path.

In one embodiment, the late choice allows a given design to not be penalized by over-pipelining of the protocol, at the expense of having to do placement of the programmable latch/repeaters at the last minute, which may be difficult. The configurable signal paths allow the distance to be decided a-priori, given the cycle time goal for the design, while ensuring the design is not inflexibly "stuck" with that number, even if timing within some module ended up forcing the design to run slower than the goal and higher per-clock performance could have been achieved by using fewer programmable latch/repeaters.

In one embodiment, to achieve an optimal flexibility, a large number of programmable latch/repeaters are coupled along the path, wherein the number of programmable latch/repeaters is higher than the number required to meet the cycle time goals (e.g. every ⅓ cycle instead of every cycle). Each of the programmable latch/repeaters logically comprise a storage element and a buffer, where the storage element is used to optionally stage the signal by one cycle under external binary control. When the storage element is disabled, the programmable latch/repeater acts like a traditional buffer/repeater. When the storage element is enabled, the programmable latch/repeater acts like a latch or flip flop storage element followed by a buffer/repeater. In the system 300 embodiment, the external binary control is provided by the configuration control module 310. The chip is then designed according to this methodology. Then, depending on the target frequency as defined by either the achieved local timing of the communicating modules, or the system/platform constraints of operation, a sufficient set of programmable latch/repeaters are enabled to guarantee communication timing, but the rest are disabled and used as pass-through buffers.

The external control provided by the control module 310 can be implemented using a number of different means. In one embodiment, the control module 310 is software programmable to enable the variable number of programmable latch/repeaters. For example, in one embodiment, the chip resets with all the storage elements in the programmable latch/repeaters enabled, and then the control module 310 turns some of the programmable latch/repeaters off. Software control has the advantage that the chip can change its per-clock performance dynamically as operating conditions vary. For example, mobile chips often run at different frequencies in order to save power by using voltage/frequency scaling. This choice can be made by software as the chip operates.

Dynamic control can also be used to accommodate performance differences due to temperature variations. Because lower temperatures mean lower resistance, wires speed up substantially at lower temperatures. Having dynamic control of the number of programmable latch/repeaters thus allows a software algorithm to increase per-clock performance at lower temperatures, but still meet frequency goals at higher temperatures. Thus a chip so designed that is placed in a very good thermal environment would perform better than if it was placed in a worse thermal environment but was still capable of running at the same frequency.

In one embodiment, software control is eliminated and the configuration control module 310 is omitted. In such embodiment, late metal-level changes to the chip are built-in according to achieved frequency, thereby enabling or disabling the programmable latch/repeaters individually. In one embodiment, on die fuses can be used to enable or disable the programmable latch/repeaters individually. In another embodiment, external pins communicating which programmable latch/repeaters should be enabled or disabled can be used. In each case, at the higher frequencies, more programmable latch/repeaters would be required, but at the lower frequencies fewer would be required.

Figure 4:
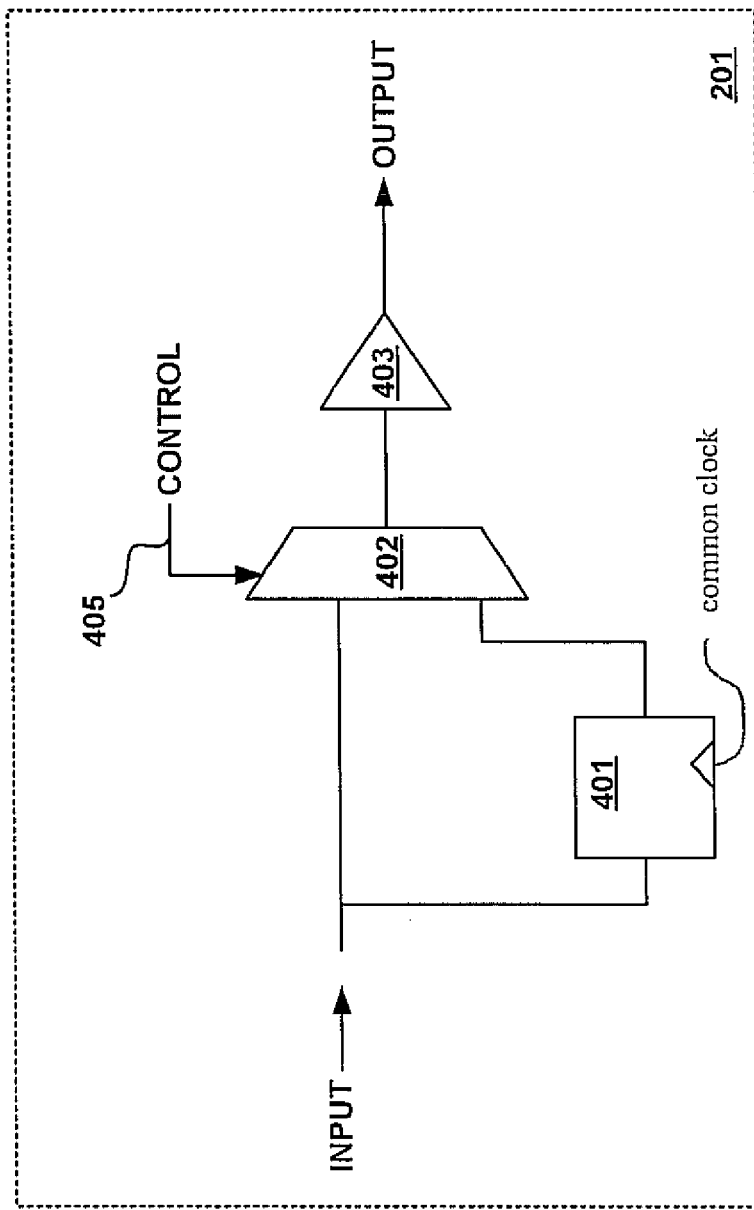
FIG. 4 shows a diagram of an exemplary programmable latch/repeater in accordance with one embodiment of the present invention.

FIG. 4 shows a diagram of an exemplary programmable latch/repeater 201 in accordance with one embodiment of the present invention. The programmable latch/repeater 201 comprises a storage element 401 (e.g., flop/register) and a multiplexer 402 controlled via a control input 405. When the programmable latch/repeater 201 is switched onto the signal path, the multiplexer 402 selects the output of the storage element 401 and couples this output to an output buffer 403. When the programmable latch/repeater 210 is switched off of the signal path, the multiplexer 402 selects the input and couples it directly to the output buffer 403. Thus the control input 405 determines whether the programmable latch/repeater 201 is on the signal path or off the signal path.

Figure 5:
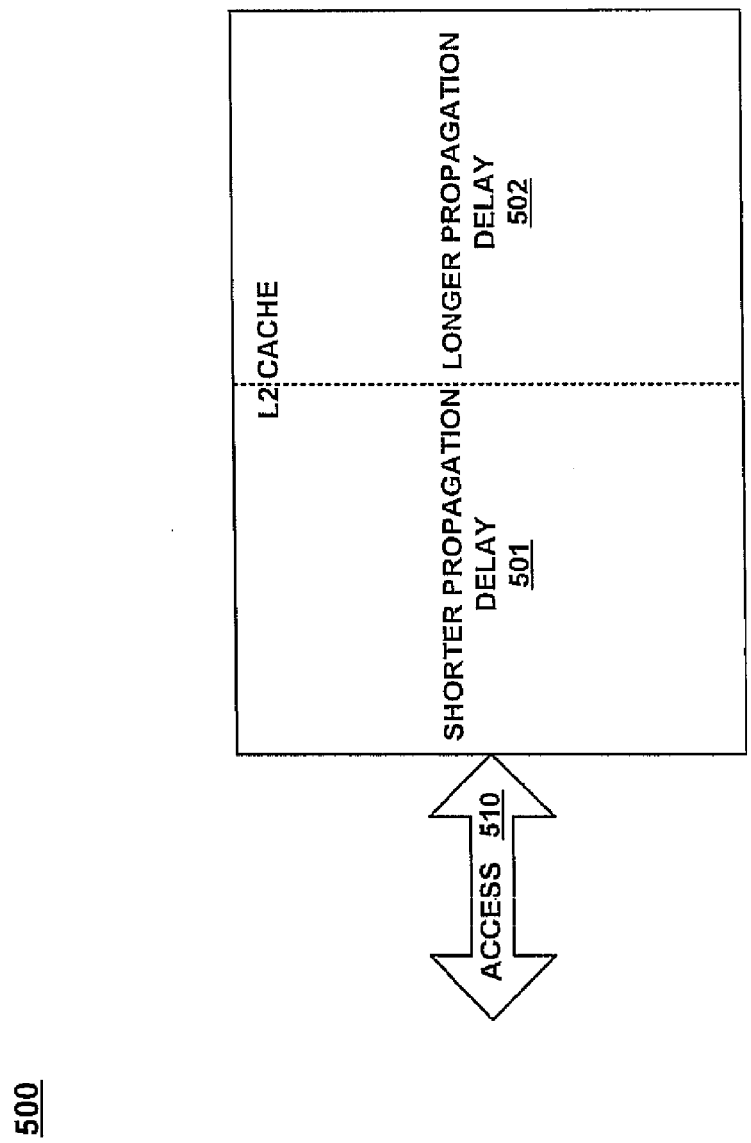
FIG. 5 shows a diagram depicting a cache architecture in accordance with one embodiment of the present invention.

FIG. 5 shows a diagram depicting a cache architecture 500 in accordance with one embodiment of the present invention. As depicted in FIG. 5, the architecture 500 comprises an L2 cache having a first block 501 having comparatively short propagation delay with respect to the access path 510 (e.g., to a CPU core), and a second block 502 having a comparatively long propagation delay with respect to the access path 510.

In the cache architecture 500 embodiment, the cache 500 can be structured as a set of daisy-chained blocks where each block not only receives/sends data stored within it but also serves as a conduit for the data of subsequent blocks. FIG. 5 shows two such blocks 501 and 502. At a high frequency of operation, the first block 501 would have to register/repeat the data from the second block 502, as the wires between the blocks would take up a fair amount of time. At progressively lower frequencies, the number of programmable latch/repeaters required would be lower and the cache would become faster in cycles. Thus the cache architecture 500 embodiment, a large outer cache (e.g., L2 cache), is particularly well-suited for the configurable signal paths of the present invention. Even larger cache architectures would realize a correspondingly larger benefit (e.g., L3 cache).

Figure 6:
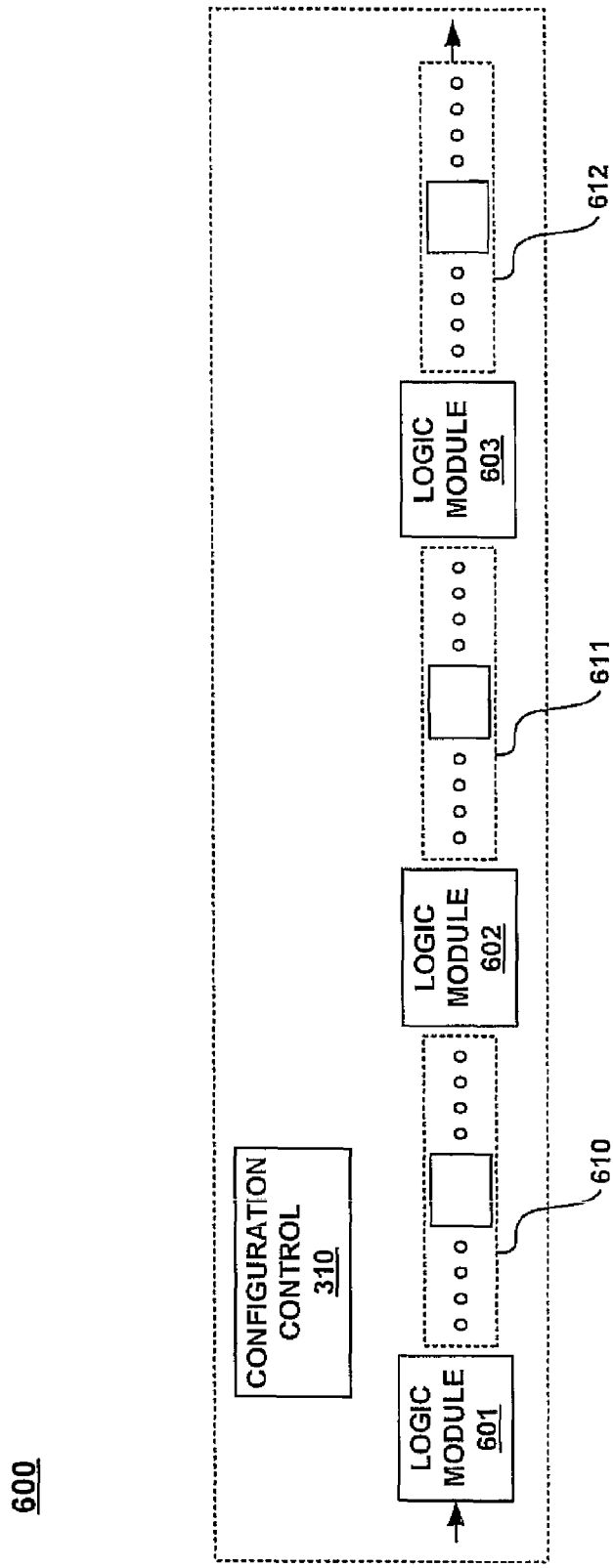
FIG. 6 shows a diagram depicting a logic execution architecture in accordance with one embodiment of the present invention.

FIG. 6 shows a diagram depicting logic execution architecture 600 in accordance with one embodiment of the present invention. As depicted in FIG. 6, the logic execution architecture 600 comprises a plurality of logic modules 601-603 coupled via a plurality of configurable signal paths 610-613.

In one embodiment, the logic execution architecture 600 comprises a pipeline architecture of a processor (e.g., CPU). In such an embodiment, at high frequency, the processor becomes super-pipelined with long latencies between data-dependent operations of the logic modules 601-603. For example, the result of an ADD may not be available until two cycles later. At lower frequencies, the processor is pipelined in the ordinary fashion, with lower latencies between data-dependent operations. The result of an ADD would be available the following cycle. These differences can be accommodated by configuring the number of programmable latch/repeaters included within the configurable signal paths 610-613.

Depending upon a particular configuration, in the middle of a data path a buffer/repeater may not be needed. An optional latch/flip flop may be sufficient. In other words, a data path may be dominated by gate propagation delay and not have much wire component, so the buffer/repeater aspect is unnecessary. However, the concept is the same. A given design is over-pipelined, and some later time the number of programmable latch/repeaters, or latch/flip flops, required on the signal paths is chosen. For example, in a case where a given multiplier or adder can work in 2 cycles at low frequencies and 3 cycles at high frequencies, for the 2 cycle case, a latch/register would be coupled onto the signal path in the middle. For the 3 cycle case, latch/registers would be coupled every third. The elasticity attribute would be obtained by adding latch/registers every third, and in the middle (e.g., one extra latch/register over what the 3-cycle version would have). Late binding (e.g., software, fuses, strapping pins, metal option, etc.) selection would then be used to choose between 2 and 3 added latch/registers. However, it should be noted that these latches/registers would not a-priori need a repeater aspect.

In one embodiment, the logic execution architecture 600 comprises a special register protocol. Many CPUs have a special, slow, bus to read and write special (e.g., control) registers that are not accessed frequently. In such an embodiment, the configurable signal paths 610-613 would accommodate the larger number of needed cycles at high frequency and fewer number needed cycles at lower frequencies to access such special registers.

In one embodiment, the logic execution architecture 600 comprises a portion of a system-on-a-chip (SOC) design. A "system-on a-chip" is a chip that includes a CPU and sufficient peripheral controller blocks to largely implement a full computer system by itself (with the possible and common exceptions of storage such as DRAM, FLASH/ROM for the initial program load, and disk). Typically, such systems on a chip are designed by taking a standard CPU core design as a "hard macro" which cannot be restructured and placing and connecting the peripheral controller blocks with it. This is problematic for high-performance CPUs due to the fact that their floorplan can severely constrain the ability of the SOC designer to place the peripheral controller blocks without making the chip overly wasteful (e.g., white space) and large.

A CPU core designed using elastic pipelines in accordance with the present invention can be decomposed into a number of comparatively smaller hard macros that can be re-arranged as long as suitable additional programmable latch/repeaters are placed between the blocks. This is much different than being a single large monolithic hard macro. This allows the SOC designer to trade-off per-clock performance against the size and floor plan of the chip and time to market, without affecting the maximum frequency of the chip, or its correct operation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for configuring a signal path within a digital integrated circuit, comprising:
   transmitting an output from a first module;
   receiving the output at a second module;
   conveying the output from the first module to the second module by using a configurable signal path, wherein the configurable signal path is variable by selectively including at least one latch, and wherein the first module, the second module, and the configurable signal path use a common clock for a single time domain.

2. The method of claim 1, wherein a control module is used to selectively include the at least one latch onto the configurable signal path.

3. The method of claim 2, wherein the control module is configured to include the at least one latch onto the configurable signal path to increase a clock frequency of the configurable signal path.

4. The method of claim 3, wherein the control module is configured to include a variable number of latches onto the configurable signal path to accommodate a variable increase of the clock frequency of the configurable signal path.

5. The method of claim 1, wherein the digital integrated circuit comprises a logic unit having a plurality of logic modules, and wherein a corresponding plurality of configurable signal paths couple the logic modules into a pipeline.

6. The method of claim 1, wherein the latch comprises a storage element and a multiplexer configured to selectively couple the storage element to the configurable signal path in accordance with a control signal.

7. The method of claim 1, wherein the first module comprises a first portion of a cache memory and the second module comprises a second portion of the cache memory.

8. A digital integrated circuit having a configurable signal path, comprising:
   a first module configured to transmit an output;
   a second module configured to receive the output;
   a configurable signal path for conveying the output from the first module to the second module, wherein the configurable signal path is variable by selectively including at least one latch, and wherein the first module, the second module, and the configurable signal path use a common clock comprising a single time domain.

9. The digital integrated circuit of claim 8, wherein a control module operates with a software based algorithm to dynamically include the at least one latch onto the configurable signal path.

10. The digital integrated circuit of claim 9, wherein the control module is configured to include the at least one latch onto the configurable signal path to increase a clock frequency of the configurable signal path.

11. The digital integrated circuit of claim 10, wherein the control module is configured to include a variable number of latches onto the configurable signal path to accommodate a variable increase of the clock frequency of the configurable signal path.

12. The digital integrated circuit of claim 8, wherein the digital integrated circuit comprises a logic unit having a plurality of logic modules, and wherein a corresponding plurality of configurable signal paths couple the logic modules into a pipeline.

13. The method of claim 8, wherein the first module comprises a first portion of a cache memory and the second module comprises a second portion of the cache memory.

14. A method for configuring a signal path within a digital integrated circuit, comprising:
   transmitting an output from a first module;
   receiving the output at a second module;
   selectively including at least one storage element onto a configurable signal path, wherein a control module is used to selectively include the at least one storage element onto the configurable signal path;
   conveying the output from the first module to the second module by using the configurable signal path, wherein the first module, the second module, and the configurable signal path use a common clock comprising a single time domain.

15. The method of claim 14, wherein a control module is configured to remove a variable number of storage elements from the configurable signal path to accommodate a variable decrease of the clock frequency of the configurable signal path.

16. The method of claim 14, wherein the digital integrated circuit comprises a cache memory.

17. The method of claim 14, wherein the digital integrated circuit comprises a logic unit having a plurality of logic modules, and wherein a corresponding plurality of configurable signal paths couple the logic modules into a pipeline.

18. The method of claim 14, wherein a software based algorithm is used to dynamically include the at least one storage element onto the configurable signal path to increase a clock frequency of the configurable signal path.

19. A circuit comprising configurable signal path circuit for implementing a configurable signal path to convey an output from a first module to a second module, wherein the configurable signal path is variable by selectively including at least one latch, and wherein the first module, the second module, and the configurable signal path circuit use a common clock comprising a single time domain.

20. The circuit of claim 19, further comprising a control module for operating in accordance with an algorithm to dynamically include the at least one latch onto the configurable signal path.

21. The circuit of claim 20, wherein the control module is configured to include the at least one latch onto the configurable signal path to increase a clock frequency of the configurable signal path.

22. The circuit of claim 20, wherein the control module is configured to include a variable number of latches onto the configurable signal path to accommodate a variable increase of the clock frequency of the configurable signal path.

* * * * *